United States Patent [19]
Lemcoff et al.

[11] Patent Number: 5,807,423
[45] Date of Patent: Sep. 15, 1998

[54] PROCESS AND APPARATUS FOR GAS SEPARATION

[75] Inventors: Norberto O. Lemcoff, Livingston; Mario A. Fronzoni, East Brunswick, both of N.J.; Michael E. Garrett, Woking; Brian C. Green, Brockham, both of England; Tim Atkinson, Jersey City; Alberto I. La Cava, Guttenberg, both of N.J.

[73] Assignee: The BOC Group, Inc., New Providence, N.J.

[21] Appl. No.: 722,586

[22] Filed: Sep. 27, 1996

[51] Int. Cl.⁶ .................................................. B01D 53/047
[52] U.S. Cl. ........................... 95/96; 95/130; 95/138; 96/124; 96/130; 96/133
[58] Field of Search .................. 95/95–105, 107, 95/113, 130, 138; 96/108, 115, 121, 124, 130, 133

[56] References Cited

U.S. PATENT DOCUMENTS

| Re. 35,099 | 11/1995 | Hill | 95/98 |
|---|---|---|---|
| 2,706,532 | 4/1955 | Ringo et al. | |
| 2,751,032 | 6/1956 | Ringo et al. | 96/124 |
| 2,771,964 | 11/1956 | Miller | 95/113 |
| 3,201,921 | 8/1965 | Heyes | 95/113 X |
| 3,923,477 | 12/1975 | Armond et al. | 95/103 |
| 4,264,339 | 4/1981 | Jüntgen et al. | 95/96 |
| 4,469,494 | 9/1984 | van Weenen | 96/124 |
| 4,877,429 | 10/1989 | Hunter | 95/95 |
| 4,925,464 | 5/1990 | Rabenau et al. | 96/124 X |
| 4,971,611 | 11/1990 | Noguchi | 96/124 X |
| 5,112,367 | 5/1992 | Hill | 95/98 |
| 5,114,441 | 5/1992 | Kanner et al. | 95/98 |
| 5,176,722 | 1/1993 | Lemcoff et al. | 95/102 |
| 5,248,325 | 9/1993 | Kagimoto et al. | 96/124 |
| 5,268,021 | 12/1993 | Hill et al. | 95/98 |
| 5,366,541 | 11/1994 | Hill et al. | 96/124 |
| 5,441,559 | 8/1995 | Petit et al. | |
| 5,487,775 | 1/1996 | LaCava et al. | 95/107 X |
| 5,520,720 | 5/1996 | Lemcoff | 95/103 X |
| 5,584,322 | 12/1996 | Pöschl et al. | 96/124 X |
| 5,593,480 | 1/1997 | Pöschl | 96/124 |
| 5,632,804 | 5/1997 | Schartz | 95/101 |

FOREIGN PATENT DOCUMENTS 0 107 179   5/1984   European Pat. Off. .
0512 534 A1  11/1992  European Pat. Off. .

*Primary Examiner*—Robert Spitzer
*Attorney, Agent, or Firm*—Coleman R. Reap; Salvatore P. Pace

[57] ABSTRACT

A rotary valve assembly which includes of a pair of valve parts with flat faces which, when pressed together and rotated, provide valving action between various ports incorporated in one of the valve parts. The first valve part contains two circular arrays of through openings, each of which is connected to a conduit. The second valve part contains several passages which provide communication between various openings of the first valve part and valve ports located in the second valve part. The second valve part also contains one or more passages which provide communication between members of one array of openings. The valve assembly can be effectively used to automate operation of a gas or liquid adsorption system comprising two or more adsorption vessels, the number of vessels being equivalent to the total number of openings in either array. Use of the valve assembly in an adsorption system eliminates the need for many of the valves required in conventional multivessel adsorption systems.

32 Claims, 3 Drawing Sheets

PROCESS AND APPARATUS FOR GAS SEPARATION

FIELD OF THE INVENTION

This invention relates to the separation of gases by pressure swing adsorption (PSA), and more particularly to an adsorption system comprised of a plurality of adsorption vessels arranged in parallel and operated sequentially to provide a quasi-continuous supply of nonadsorbed gas product. Sequencing of the adsorption vessels in the production cycle is controlled by means of a rotary valve which, by its rotation controls the flow of the various gas streams to and from the adsorption vessels.

BACKGROUND OF THE INVENTION

Cyclic adsorption processes are generally practiced in batteries of adsorption vessels comprised of two or more adsorbent-filled vessels arranged in parallel and operated out of phase such that at least one vessel is in the adsorption mode while at least one other vessel is in the adsorbent regeneration mode. In each cycle of the process a series of sequential steps, including adsorption, equalization and regeneration, are carried out in each vessel. To enable the various streams to flow to and from the vessels, the feed, product, and exhaust lines must be provided with valves to permit gas flow through these lines at the appropriate time in the adsorption cycle. Furthermore, cross-connecting lines must be provided between the inlet ends of the vessels and between the outlet ends of the vessels to permit flow between the vessels during pressure equalization steps, and each cross connecting line must be equipped with a valve to control the flow of gas through these lines. All in all, each vessel of the system is provided with at least three valves, and each valve is opened and closed at least once during each cycle of the process. PSA cycles are commonly as short as one minute, accordingly each valve may be required to open and close sixty or more times each hour that the system is in operation. Not only is there considerable wear on each valve over the course of an adsorption run, but considerable energy is expended just to open and close the valves of the system during operation of the plant.

Adsorption processes are inherently batch-type processes. Nonadsorbed gas product is produced only during the adsorption step and desorbed gas product is produced only during the adsorbent regeneration step of the process. Because of this, the desired product is produced, at best, for no more than one-half of each cycle. Since it is often desirable or necessary that a continuous flow of product be available, for example when oxygen is provided for medical purposes, improvements to adsorption systems and processes which provide better product flow continuity are continually sought. Recently, efforts have been made to develop adsorption systems that operate somewhat like continuous process systems. Some of the more promising new adsorption plant designs are based on the principle of rotation. In some designs the adsorption units rotate through stationary gas zones, while in other designs the adsorption units are stationary while gas flow is sequenced through the various units of the system.

U.S. Pat. No. 4,925,464, discloses a simple rotary valve assembly for use with adsorption vessels. The assembly consists of two valve members which have respectively engaged surfaces that are relatively rotatable to provide valving action. The valve assembly of this patent permits fluid to flow to and from the various adsorption vessels at appropriate times during the process cycle. The disclosure of this patent is incorporated herein by reference.

Useful pressure swing adsorption plant designs which incorporate rotary valves are described in U.S. Pat. Nos. 5,268,021, 5,366,541 and Pat. No. Re. 35,099, the disclosures of all of which are incorporated herein by reference. Each of these patents disclose controlling the operation of a battery of two or more adsorption vessels during a PSA process by a rotary valve which directs feed to and desorbed component from the various adsorption vessels of the system. The rotary valve described in these patents also provides for the transfer of fluid from one vessel to another during a pressure equalization step. Pressure equalization is the passage of gas from a first vessel that has just completed its adsorption step to a vented or evacuated vessel which has just completed its adsorbent regeneration step. In the above patents the flow of fluid during pressure equalization is from the higher pressure vessel via its inlet end, then through the rotary valve, then into the low pressure vessel via its inlet end. This method of bed equalization, referred to herein as "inlet to inlet equalization", is not very efficient for certain adsorption processes because less of the fractionated gas near the outlet end of the first vessel is transferred to the second vessel. The gas remaining in the first vessel is lost during the following depressurization step.

More efficient operation of adsorption system operation is achieved when other pressure equalization techniques are employed. A particularly useful pressure equalization method is that known as "outlet-to-outlet equalization", during which fluid flows from the high pressure vessel to the low pressure vessel by parallel flow through both the inlets and the outlets of the vessels. This technique is described in detail in U.S. Pat. No. 5,176,722, the disclosure of which is incorporated herein by reference.

There is a need for a rotary valve which can enable an adsorption system to operate with adsorption cycles which include the above-described outlet-to-outlet pressure equalization step. This invention provides rotary valve assemblies which have these capabilities, and which enable additional steps, such as product gas flow, vessel purging and product fluid backfill to be automatically controlled without additional valves,

SUMMARY OF THE INVENTION

In its broadest aspect the invention comprises a valve assembly for providing by selective flow communication between first fluid flow conduits and between second fluid flow conduits. The assembly comprises three components; a first valve member, a second valve member and a drive means for causing relative rotation of the first and second valve members. The first and second valve members have smooth surfaces which are engaged and which are relatively rotatable about a common center of rotation to provide valving action. The first valve member has two sets of equally spaced through apertures: a first set of apertures concentrically disposed about the common center of rotation at a first radius, with each aperture of the first set being in fluid communication with one of the above-mentioned first fluid flow conduits; and a second set of apertures concentrically disposed about the common center of rotation at a second radius, with each aperture of the second set being in fluid communication with one of the above-mentioned second fluid flow conduits. The first and second sets of apertures have the same number of apertures. The second valve member has at least one flow passage means for selectively interconnecting two apertures of the first set of apertures, one or more feed ports, one or more exhaust ports, at least one feed flow passage means for providing fluid communication between the feed port(s) and one or more apertures of the second set of apertures and at least one exhaust flow passage means for providing fluid communication between the exhaust port(s) and one or more apertures of the second set of apertures. The drive means serves to provide relative rotation of the valve members to enable rotationally cycled interconnection and fluid flow between two apertures of the first set of apertures, between the feed port(s) and one or more apertures of the second set of apertures and between the exhaust port(s) and one or more apertures of the second set of apertures.

In a preferred embodiment the first valve member is stationary and the second valve member is rotatable.

In another preferred embodiment the first and second sets of apertures comprise the same even number of apertures.

In one arrangement of the above aspect of the invention, the first and second sets of apertures each have two apertures, and the second valve member has one flow passage means for selectively interconnecting the two apertures of the first set of apertures, one feed port, one exhaust port, one feed flow passage means for providing fluid communication between the feed port and one or more apertures of the second set of apertures and one exhaust flow passage means for providing fluid communication between the exhaust port and one or more apertures of the second set of apertures.

In another arrangement, the first and second sets of apertures of the first valve member of the valve assembly each have more than two apertures. In a more preferred version of this arrangement the second valve member has two flow passage means, each of which selectively interconnects two apertures of the first set of apertures, one or more feed ports, one or more exhaust ports, two feed flow passage means for providing fluid communication between the feed port(s) and one or more apertures of the second set of apertures and two exhaust flow passage means for providing fluid communication between the exhaust port(s) and one or more apertures of the second set of apertures. In a most preferred arrangement each set of apertures of the first valve member has a total of 8, 12, 16 or 20 apertures.

In one embodiment of the invention the drive means produces continuous relative motion of the valve members, and in another embodiment it produces stepwise relative motion of the valve members.

A second aspect of the invention is an adsorption system comprising the above-described valve assembly and an array of adsorption vessels each having a feed inlet end and a product outlet end, with each vessel containing an adsorbent which preferentially adsorbs one or more fluids of a fluid mixture relative to one or more other fluids of the mixture. In this aspect, each conduit of the first set of fluid flow conduits is connected to the product outlet end of one vessel of the array of adsorption vessels and each conduit of the second set of fluid flow conduits is connected to the feed inlet end of one vessel of the array of adsorption vessels.

The adsorption vessels may be straight elongate vessels or they may be U-shaped or concentric so that, for example, their inlet ends and outlet ends are adjacent or somewhat adjacent each other.

In a preferred embodiment, the adsorption system comprises a valve assembly in which the first and second sets of apertures of the first valve member of the valve assembly each have more than two apertures, and the second valve member has two flow passage means each of which selectively interconnects two apertures of the first set of apertures, one or more feed ports, one or more exhaust ports, two feed flow passage means for providing fluid communication between the feed port(s) and one or more apertures of the second set of apertures and two exhaust flow passage means for providing fluid communication between the exhaust port(s) and one or more apertures of the second set of apertures.

In a more preferred embodiment of the above-described valve assemblies and adsorption systems, the second valve member of the valve assembly additionally has one or more product ports and at least one product passage means for providing fluid communication between the product port(s) and one or more apertures of the first set of apertures. In this aspect, the product port(s) are at least partly located in the radial sector or sectors from the common center of rotation in which the feed port(s) are located. Also, in this aspect the second valve member preferably also has at least one backfill port and at least one backfill passage means for providing fluid communication between the backfill port(s) and one or more apertures of the first set of apertures. Part of the product port(s) may serve as backfill port(s). Furthermore, in this aspect the second valve member preferably additionally has one or more purge ports and at least one purge port passage means for providing fluid communication between the purge port(s) and one or more apertures of the first set of apertures. The purge port(s) may be located in the radial sector or sectors radiating from the common center of rotation in which the exhaust port(s) are located. The radial sector or sectors in which the purge port(s) are located may have a lesser angular extent, i.e. they may be narrower, than the radial sector or sectors in which the exhaust port(s) are located.

In another aspect, the invention is a process comprising introducing into the feed port(s) of the above-described adsorption systems, while the first and second valve members are in relative rotation, a fluid mixture which contains a first component which is preferentially adsorbed by the adsorbent contained in the adsorption vessels relative to a second component of the fluid mixture, while withdrawing through the product port(s) fluid enriched in the second component and withdrawing from the exhaust port(s) fluid enriched in the first component and providing outlet-to-outlet equalization between selected vessels of the system. The process is particularly suitable for fractionating gaseous mixtures, such as air. The adsorbed component of the air may be oxygen or it may be nitrogen.

BRIEF DESCRIPTION OF THE DRAWINGS

The invention is illustrated in the appended drawings in which.

The same or similar reference numerals are used to represent the same or similar parts in the various drawings.

Figure 1:
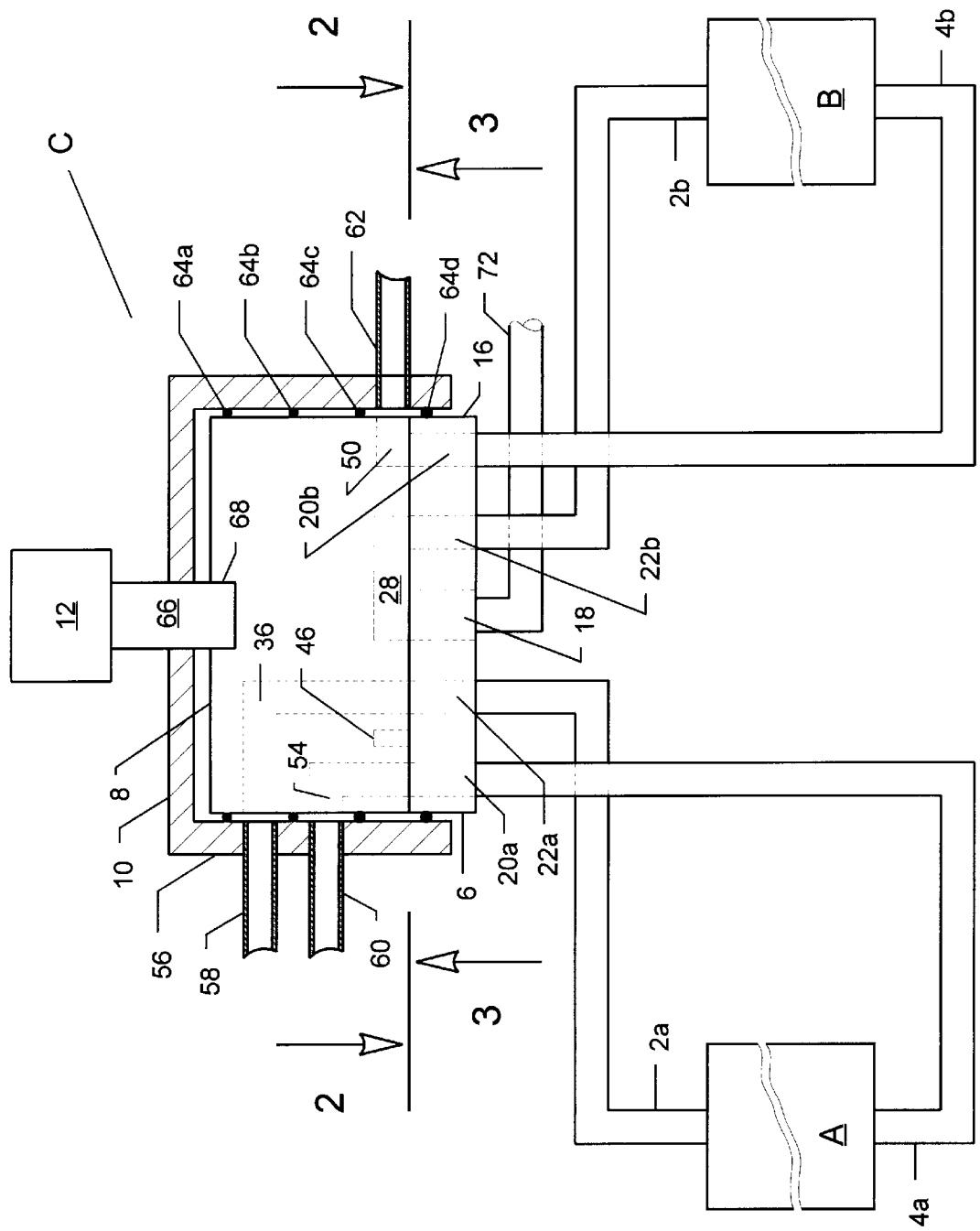
FIG. 1 is a view, partly in section, of a two vessel adsorption system incorporating the novel valve assembly of the invention.

Valves, lines and equipment that are not necessary for an understanding of the invention have not been included in the drawings.

DETAILED DESCRIPTION OF THE INVENTION

The invention involves several aspects: rotary valve assemblies that can be used in various industrial processes in which a fluid is transferred from one point to another; multiple vessel adsorption systems that use these rotary valve assemblies; and processes for fractionating fluids using the multiple vessel adsorption systems of the invention. As used herein the term "fluid" includes both gases and liquids. The process aspect of the invention will be described in detail as it applies to the fractionation of gases, although it applies equally well to liquid fractionations.

A principal function of the valve assemblies of the invention is to provide outlet-to-outlet pressure equalization between an adsorption vessel that has just completed its adsorption step and one that has just completed its adsorbent regeneration step, and to control the flow of the feed stream to and the flow of exhaust gas from the various adsorption vessels of the system, but they can be used to control the flow of all streams of the adsorption system, as described below.

The invention can be more thoroughly understood from the following description, considered with the appended drawings. Turning now to the drawings, and particularly to FIGS. 1–4, illustrated therein is an adsorption system comprising two adsorption vessels, A and B, and a rotary valve assembly C. The inlet ends of vessels A and B are connected to feed lines 2a and 2b, respectively, and the outlet ends of the vessels are connected to product gas outlet lines 4a and 4b, respectively. Valve assembly C comprises valve port disk 6, valve passage disk 8, valve assembly cover 10 and drive motor 12.

In the embodiment illustrated in FIGS. 1–4, valve port disk 6 and valve passage disk 8 are shown as circular in construction, although they may be shaped otherwise, for example polygonal. Valve port disk 6 and valve passage disk 8 are preferably made from a durable material such as ceramic, which can be ground to a highly polished flat finish to enable the faces of the disks to form a fluid-tight seal when pressed together.

Valve port disk 6 has a highly polished flat circular engagement surface 14, a smooth cylindrical sidewall 16 (FIG. 1), feed opening 18, outer openings 20a, 20b and inner openings 22a, 22b. Openings 20a and 20b lie in the same ring array, i.e. they each are the same radial distance from the geometric center of surface 14. Openings 22a and 22b likewise lie in the same ring array. Openings 18, 20a, 20b, 22a and 22b are on the same diameter line through the geometric center of circular surface 14, and they extend completely through disk 6 in a direction perpendicular to surface 14. Openings 20a and 20b are shown as being the same size as openings 22a and 22b, although they can have different sizes. All openings of a given array of openings are the same size, however.

Valve passage disk 8, which likewise has a highly polished smooth engagement circular surface 24 and a smooth sidewall 26, has several arcuate passages or channels cut into surface 24, each of which has as its center of rotation the geometric center of circular surface 24. These include optional blind feed passage 28, which has a center circular portion 30 and an arcuate passage portion 32; optional arcuate exhaust passage 34, which has a bore 36 that initially extends into disk 8 in a direction perpendicular to surface 24 and then extends radially outward to the peripheral sidewall 26 of disk 8 (see FIG. 4); blind equalization passage 44, which has an arcuate portion 46 and grooved end portions 48; optional arcuate product port 50, which extends radially outward to and cuts through sidewall 26 of disk 8; and optional arcuate purge passage 52, which has a bore 54 that likewise initially extends into disk 8 in a direction perpendicular to surface 24 and then extends radially outward to peripheral sidewall 26 of disk 8 (see FIG. 4). When disk 8 is placed on top of disk 6 in such a manner that surface 14 of disk 6 engages surface 24 of disk 8 with their geometric centers coinciding, arcuate passages 32 and 34 coincide with the annulus in which openings 22a and 22b are located, and they come into registration with these openings upon rotation of disk 8; and the inner portion of optional arcuate product port 50, optional arcuate purge passage 52 and a part of end portions 48 of equalization passage 44 coincide with the annulus in which openings 20a and 20b are located, and they come into registration with these openings upon rotation of valve disk 8.

Returning to FIG. 1, valve assembly cover 10 has a cylindrical sidewall 56 and is provided with exhaust line 58, optional purge fluid supply line 60, and optional product gas line 62 which, in the illustrated embodiment, extend through sidewall 56. The inside diameter of sidewall 56 is somewhat greater than the outside diameters of valve disks 6 and 8. Positioned between the inside surface of sidewall 56 and disks 6 and 8 are a number of resilient annular seal rings 64a, 64b, 64c and 64d, which form fluid-tight seals between the inside surface of sidewall 56 and the sidewalls of disks 6 and 8. These seal rings, together with disk sidewalls 16 and 26 and the inside wall of sidewall 56, form annular channels around disks 6 and 8 through which fluids can pass. Line 58 and bore 36 communicate with the annular passage between seal rings 64a and 64b; Line 60 and bore 54 communicate with the annular passage between seal rings 64b and 64c; and optional product gas line 62 and optional product port 50 communicate with the annular passage between seal rings 64c and 64d.

In the valve assemblies of the invention the valve port disk and the valve passage disk are pressed tightly together so that no leakage of fluid occurs between the engaged polished surfaces of the valve disks. This can be accomplished, for example, by means of a spring or by means of fluid pressure, as described in above-mentioned U.S. Pat. Nos. 5,268,021, 5,366,541 and Pat. No. Re. 35,099.

Figure 2:
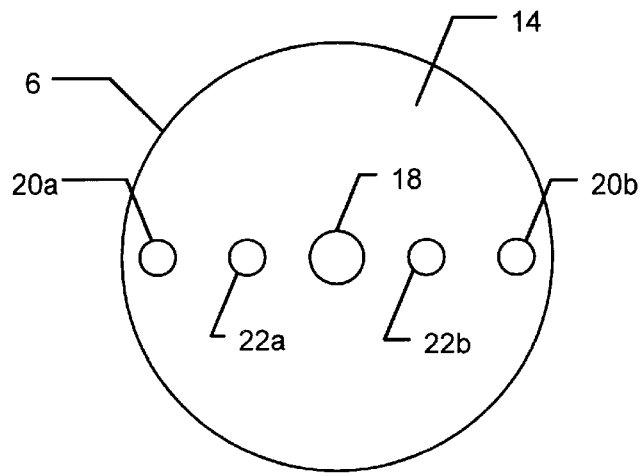
FIG. 2 is a plan view of the valve port disk used in the embodiment of FIG. 1, taken along the line 2—2 of FIG. 1.
Figure 3:
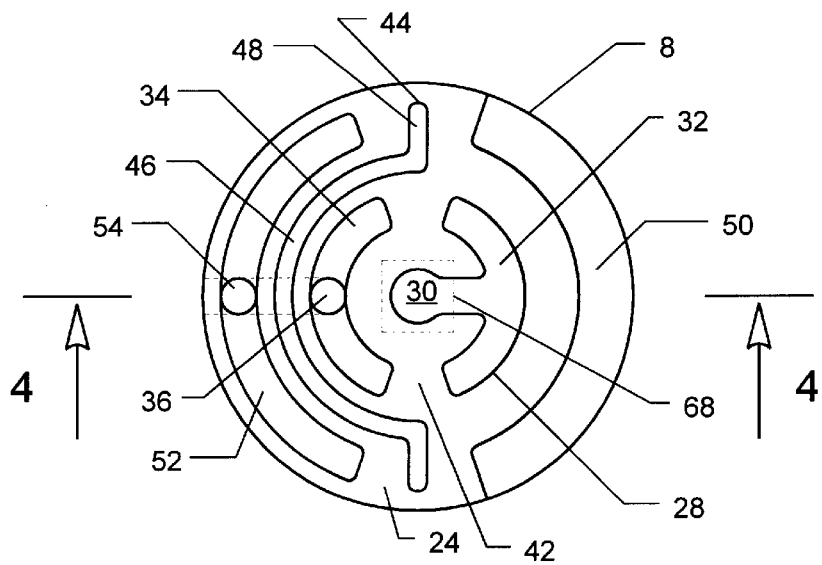
FIG. 3 is a plan view of the valve passage disk used in the embodiment of FIG. 1, taken along the line 3—3 of FIG. 1.

Drive motor 12 has a drive shaft 66 which extends through the top wall of valve assembly cover 10 and extends into a recess 68 in the top of valve disk 8. Motor 12 is connected to a source of electric power and has a control mechanism (not shown) for controlling the direction and speed of rotation of shaft 66. As drive shaft 66 rotates it causes valve disk 8 to rotate, to cycle the adsorption vessels A and B through the various steps of the adsorption process. In the valve assembly of FIG. 1, valve disks 6 and 8 are arranged so that circular surfaces 14 and 24 have the same geometric center and this center serves as the center of rotation of valve disk 8. Motor 12 can impart continuous or stepwise rotation to valve disk 8 around its center of rotation. In stepwise rotation the steps may coincide with the angular distance between the centers of adjacent openings in each ring array, which in the embodiment of FIGS. 1–3 is 180°; or it may be of some lesser angular extent such that the angular distance between the centers of adjacent openings of each ring array is an exact multiple of the angular extent of each step of rotation.

In the arrangement of FIG. 1, feed lines 2a and 2b are connected in a fluid-tight relationship to the lower ends of openings 22a and 22b, respectively; product gas outlet lines are connected to the lower ends of openings 20a and 20b, respectively, and feed line 72 is connected to the lower end of feed opening 18. All of these connections are fluid-tight.

Practice of the process of the invention in the system of FIG. 1 will be described as it applies to the fractionation of air with adsorption vessels A and B being packed with a particulate adsorbent which preferentially adsorbs oxygen relative to nitrogen, so that nitrogen is produced as the nonadsorbed product gas. An adsorbent such as carbon molecular sieve will provide this effect when the adsorption process is carried out on a kinetic basis.

At the beginning of the process arcuate passages 32 and 34 are in registration with the top ends of openings 22b and 22a, respectively, and arcuate product port 50 and arcuate purge port 52 are in registration with the top ends of openings 20b and 20a, respectively. In this mode, adsorption vessel B is in the adsorption stage and adsorption vessel A is in the adsorbent regeneration stage of the adsorption process. Thus, feed air which preferably has been prepurified to remove water vapor and carbon dioxide and filtered to remove solid impurities is fed at the desired pressure through line 72, opening 18, feed passage 28, opening 22b and line 2b, and into vessel B. As the air passes downwardly through vessel B, oxygen is preferentially adsorbed by the adsorbent in the adsorber and nitrogen-enriched gas passes out of the bottom of vessel B through line 4b. The nitrogen-enriched gas passes through opening 20b and arcuate product port 50 and enters the annular space defined by the outer cylindrical walls of valve disks 6 and 8, seal ring 64c and seal ring 64d. The gas then exits the system through product line 62 and is sent to product storage or a use application. It is not necessary that the product gas pass through valve assembly C. It can be removed from the system through a line connected to line 4b (not shown), if desired.

Also, at the start of the process the adsorbent in vessel A is undergoing regeneration. This is effected by depressurizing vessel A by venting gas contained in this vessel countercurrently (in the direction opposite the direction that feed gas passes through the adsorption vessel) from this vessel through line 2a. The vent gas passes through opening 22a, arcuate passage 34 and bore 36 and enters the annular space surrounding valve disk 8 and defined by outer surface 26 of disk 8, the inside surface of sidewall 56 of cover 10 and seal rings 64a and 64b. The vented exhaust gas then exits the system via line 58 and is vented to the atmosphere, or is otherwise used or disposed of. Adsorbent regeneration may be carried out by simply evacuating vessel A, or it may be assisted by purging vessel A with a gas that is lean in the adsorbed component, for example the nitrogen enriched product gas produced in vessel B during the adsorption process. If a purge step is to be included in the process, the selected purge gas is introduced into the system through line 60 and it enters the annular space defined by the inside surface of sidewall 56, surface 26 of valve disk 8 and seal rings 64b and 64c. The purge gas passes through bore 54, opening 20a and line 4a and flows countercurrently through vessel A. As it does so it flushes adsorbed oxygen from vessel A. The purged exhaust, and possibly some purge gas, pass out of the system through line 58.

As the process continues, valve disk 8 continuously rotates in a selected direction, for example clockwise as viewed in FIG. 3. During this period the adsorbed gas front in vessel B advances towards the product outlet end of this vessel. The velocity of rotation is set such that the trailing edges of passages 32 and 50 will pass out of registration with openings 22b and 22a, respectively at the exact time when the adsorption front reaches the desired end point of the adsorption step. Simultaneously, the trailing edges of passages 34 and 52 will pass out of registration with openings 20a and 20b, respectively. After these passages pass out of registration with the respective openings the adsorption step in vessel B and the bed regeneration step in vessel A are finished for the current cycle.

As rotation of valve disk 8 continues, end portions 48 of equalization passage 44 will come into registration with openings 20a and 20b. At this point gas will flow from vessel B, through line 4b, opening 20b, equalization passage 44, opening 20a, line 4a and into vessel A. Thus, gas from the outlet end of vessel B will flow into the outlet end of vessel A, thereby effecting outlet-to-outlet pressure equalization. Accordingly, the gas from vessel B which is most enriched in nitrogen will enter the product end of vessel A thus making the process highly efficient. The bed equalization step can be allowed to continue until the pressure in the two vessels reaches equilibrium or for any shorter period of time. The time extent of the equalization step is determined by the velocity of rotation and by the width of end portions 48 of equalization passage 44. End portions 48 can be as narrow or as broad as desired, within the limits set by the distance between the trailing and leading edges, respectively, of passages 50 and 52.

As valve disk 8 continues to rotate, end portions 48 of equalization passages 44 will pass out of registration with openings 20a and 20b. This marks the end of the pressure equalization step.

Upon further clockwise rotation of disk 8, the various passages come into registration with corresponding openings of disk 6 to cause vessel A to enter the adsorption mode and vessel B to enter the adsorbent regeneration mode. During this period arcuate passages 32 and 50 will be in registration with openings 22a and 20a, respectively, and arcuate passages 34 and 52 will be in registration with openings 22b and 20b, respectively. This stage of the process will be the same as the above-described adsorption step and adsorbent regeneration step except that valve disk 8 will be advanced 180°.

Upon further clockwise rotation of disk 8, passages 32, 34, 50 and 52 will eventually come out of registration with openings 22a, 22b, 20a and 20b, respectively, which event marks the end of the second adsorption-regeneration step of the cycle. As disk 8 continues to rotate clockwise end portions 48 will come into registration with openings 20a and 20b. This will initiate outlet-to-outlet pressure equalization with gas flowing from vessel A to vessel B. This step will continue until end portions 48 come out of registration with openings 20a and 20b, respectively. This will mark the end of the second pressure equalization step of the process and the end of the first cycle. Disk 8 will continue to rotate and cycle adsorbers A and B through each cycle of the process until the adsorption run ends.

Figure 4:
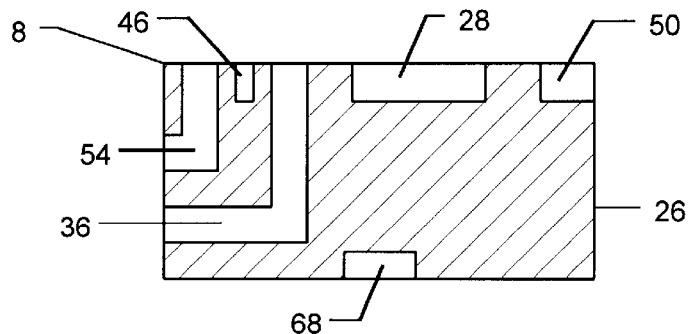
FIG. 4 is a cross-sectional view of the valve passage disk of FIG. 3, taken along the line 4—4 of FIG. 3.
Figure 5:
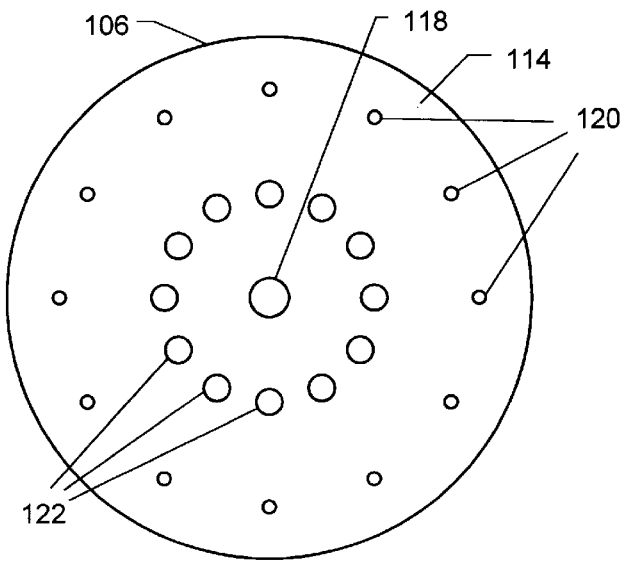
FIG. 5 is a plan view of a valve port disk for use in a twelve vessel adsorption system.
Figure 6:
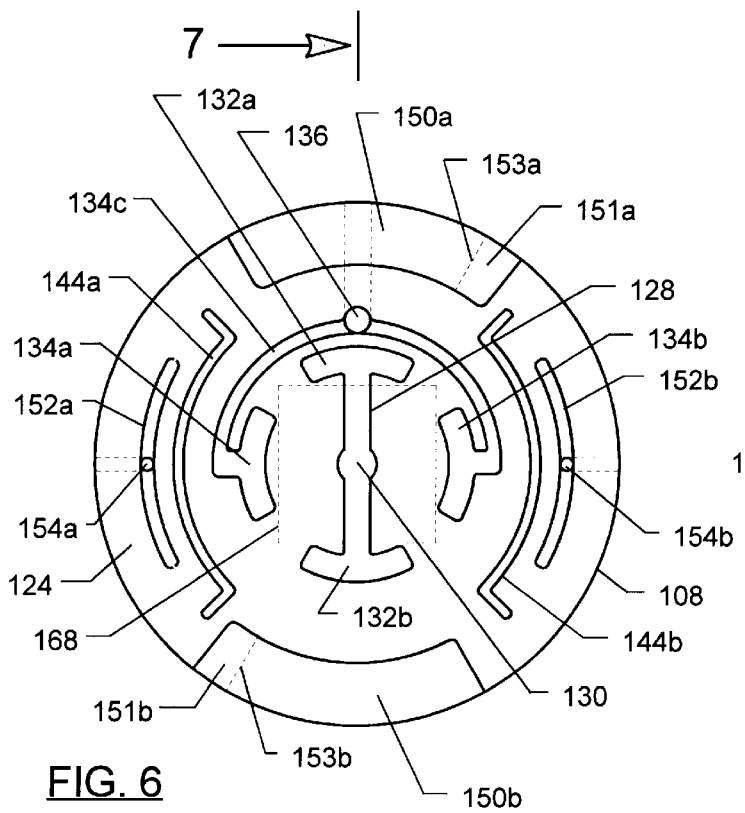
FIG. 6 is a plan view of a valve passage disk designed for use with the valve port disk of FIG. 5.
Figure 7:
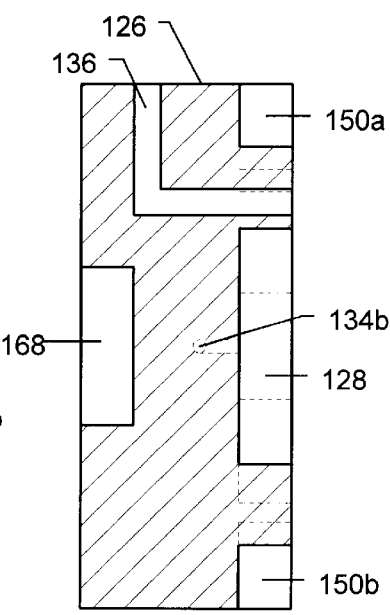
FIG. 7 is a sectional view of the valve passage disk of FIG. 6, taken along the line 7—7.

FIGS. 5–7 illustrate the construction of a valve port disk and a valve passage disk that are intended for use in the multiple vessel embodiment of the invention. Valve port disk 106 and valve passage disk 108 are likewise shown as circular in construction, although they may have other shapes. As in the embodiment illustrated by FIGS. 1–4, valve port disk 106 and valve passage disk 108 are preferably made of a durable material such as ceramic, which can be ground to a highly polished flat finish to enable the faces of the disks to form a fluid-tight seal when pressed together.

Valve port disk 106 has a highly polished flat circular engagement surface 114; a smooth cylindrical sidewall (like sidewall 16 of disk 6, FIG. 1); a feed inlet opening 118; an inner array of twelve equally spaced openings 122, each of which is attached via a flow conduit to the inlet end of an adsorption vessel; and an outer array of twelve equally spaced openings 120, each of which is attached to the outlet end of an adsorption vessel. Openings 120 lie in the same ring array, i.e. they are all the same radial distance from the geometric center of surface 114. Openings 122 likewise lie in the same ring array. Openings 120 and 122 extend completely through disk 106 in a direction perpendicular to surface 114. Openings 120 are shown as smaller than openings 122, although they can be the same size. All openings of each specific array of openings are the same size.

As can be seen in FIG. 6, valve passage disk 108, which likewise has a highly polished smooth engagement surface 124, and a smooth sidewall 126, has several arcuate passages or channels, each of which has as its center of rotation the geometric center of surface 124. Disk 108 has a blind feed passage 128 with a center portion 130 and two diametrically opposed arcuate passage portions 132a and 132b; a pair of diametrically opposed arcuate exhaust passages 134a and 134b, that are joined together by an arcuate passage 134c, which has a bore 136 that initially extends into disk 108 in a direction perpendicular to surface 124 and then extends radially outward to the peripheral sidewall 126 of disk 108 (see FIG. 6); two diametrically opposed blind equalization passages 144a and 144b, which are substantially the same in construction as equalization passage 44 of FIG. 3; an optional pair of diametrically opposed arcuate product-backfill ports 150a and 150b; and a pair of optional diametrically opposed arcuate purge passages 152a and 152b, each of which is similar in construction to arcuate purge passage 52 of FIG. 3, and each of which has a bore 154a, 154b, respectively, that likewise initially extend into disk 108 in a direction perpendicular to surface 124 and then extends radially outward to peripheral sidewall 126 of disk 108.

When disk 108 is placed on top of disk 106 in such a manner that surface 114 of disk 106 engages surface 124 of disk 108 with their geometric centers coinciding, arcuate passages 132a and 132b, 134a and 134b coincide with the annulus in which openings 122 are located, and they come into registration with these openings upon rotation of disk 108; and the inner portion of optional arcuate product-backfill ports 150a and 150b, optional arcuate purge passages 152a and 152b and the end portions of equalization passages 144a and 144b coincide with the annulus in which openings 120 are located, and they come into registration with these openings upon rotation of valve disk 108. Disk 108 also has a recess 168 into which drive shaft 66 of motor 12 snugly fits to enable disk 108 to be rotated over surface 114 of valve member 106.

In the embodiment illustrated in FIG. 6, the leading edges (the front edges when valve passage disk 108 rotates in a clockwise direction, as viewed in FIG. 6) of arcuate feed passages 132a and 132b lie on the radial vector lines indicated as lines 153a and 153b, respectively, and the trailing edges of passages 132a and 132b and those of passages 150a and 150b lie respectively on the same radial vector lines. The section of product-backfill ports 150a and 150b that are counterclockwise of lines 153a and 153b serve as product ports and the portions of ports 150a and 150b that lie clockwise of lines 153a and 1 53b, designated as sections 151a and 151b, respectively, serve as backfill ports. Backfill ports 151a and 151b provide for the flow of product gas, for example from line 62 (FIG. 1), countercurrently into the adsorption vessels that have been partially pressurized in the just-completed pressure equalization step, to further pressurize these vessels to near operating adsorption pressure. In other words, when a valve passage disk containing sections 151a and 151b is used in an adsorption process, the process will include a product backfill step. Valve passage disk 108 can, of course, be constructed without a backfill port section, in which case the leading edges of ports 150a and 150b will coincide with lines 153a and 153b, respectively.

Valve port disk 106 and valve passage disk 108 are designed to replace valve port disk 6 and valve passage disk 8, respectively in the valve assembly of FIG. 1, and the valve assembly with disks 106 and 108 will perform in the same manner as the assembly with disks 6 and 8, except that it will operate a twelve adsorber system instead of a two adsorber system. Since valve passage disk 108 has diametrically opposed feed, product-backfill, exhaust, purge and equalization passages, each adsorption vessel will undergo a complete adsorption cycle every half-rotation of valve passage disk 108. At any given time in an adsorption process using the valve members of FIGS. 5–7, four vessels will be in the adsorption phase, four will be in the bed regeneration phase and four will be approaching, in or just finished with outlet-to-outlet pressure equalization (depending upon the position of valve passage disk 108 at the time and the width of the end portions of equalization passages 144a and 144b). In a full rotation of valve passage disk 108 there will be 24 separate production stages; accordingly, the adsorption process conducted with disks 106 and 108 will produce a much more continuous flow of product than is produced in the two vessel system illustrated in FIG. 1.

The twelve port embodiment of FIGS. 5–7 has another advantage over the two port embodiment of FIGS. 2–4. Since the various gas streams pass simultaneously through diametrically opposite sides of the valve assembly when the embodiment of FIGS. 5–7 is used, pressure will be distributed equally on both sides of the valve assembly, and the valve assembly will experience less stress. This is not the case with the FIG. 2–4.

The adsorption vessels used in the system of the invention may be straight elongate vessels or they may be U-shaped or concentric so that, for example, their inlet ends and outlet ends are adjacent or somewhat adjacent each other. Concentric bed vessels have an inner cylindrical adsorbent-packed compartment surrounded by an outer annular adsorbent-packed compartment, the two compartments being of equal cross-sectional area and separated by a cylindrical wall which is sealed to one end of the vessels but does not extend to the other end of the vessels. Each compartment has an opening at the sealed end of the vessel, and fluid that is introduced into one compartment through its opening will pass axially through that compartment in one direction and axially through the other compartment in the opposite direction and leave the other compartment through its opening. A particular advantage of concentric bed adsorption vessels is the potential for heat exchange between the two beds at their feed/outlet ends.

It can be appreciated that the above-described embodiments are merely exemplary of the invention and that other embodiments are contemplated. For example, flow of the product stream produced in the adsorption process does not have to be controlled by the valve assemblies of the invention. Nor it is not necessary that the purge fluid (if the process includes a purge step) pass through the valve assemblies. The product stream can pass directly from the outlet ends of the adsorption vessels to storage, and purging can be accomplished by inserting an orifice in the product flow line. Both of these alternatives are described in U.S. Pat. Nos. 5,268,021, 5,366,541 and Pat. No. 35,099, discussed above.

Furthermore, it may be desirable to connect a vacuum means to exhaust line 58, shown in FIG. 1, to assist in the adsorbent regeneration step. Vacuum regeneration can be conducted by itself or it can be conducted with the aid of a purge stream, whether or not the purge stream passes through the valve assemblies of the invention.

It will be appreciated that it is within the scope of the present invention to utilize conventional equipment to monitor and automatically regulate the flow of gases within the system so that it can be fully automated to run continuously in an efficient manner.

The invention is further illustrated by the following hypothetical examples in which, unless otherwise indicated, parts, percentages and ratios are on a volume basis.

EXAMPLE 1

A two-vessel adsorption system similar to that illustrated in FIG. 1 is used in this hypothetical example. The valve assembly used in the system contains the valve members illustrated in FIGS. 2–4 and the adsorption vessels are packed with carbon molecular sieve. This valve assembly provides an adsorption cycle with an outlet-to-outlet equalization step. The valve assembly is operated at a rate such that the rotatable valve passage disk completes a revolution in about 120 seconds. When air which has been prepurified to remove water vapor and carbon dioxide is compressed to a pressure of about 7.5 bara (bar absolute) and fed into the feed inlet of the system at a temperature of 20° C., 168 Nliters per hour per liter of adsorbent at a purity of 99% will be produced.

EXAMPLE 2

The system illustrated in FIG. 1 is used in this example, but with a valve port disk that does not have the outer ring of openings shown in the disk illustrated in FIG. 2, and with a valve passage disk that does not include the outer equalization passage 44 of the disk illustrated in FIG. 3. In other words, the valve assembly used will provide only inlet-to-inlet pressure equalization. The valve assembly is again operated at a rate such that the rotatable valve passage disk completes a revolution in about 120 seconds. When air which has been prepurified to remove water vapor and carbon dioxide is compressed to a pressure of about 7.5 bara (bar absolute) and fed into the feed inlet of the system at a temperature of 20° C., 141 Nliters per hour per liter of adsorbent at a purity of 99% will be produced.

A comparison of the above examples shows that when the valve assembly of the invention is used, the nitrogen product flow rate will be about 19% greater than when a valve assembly which provides only inlet-to-inlet pressure equalization is used.

Although the invention has been described with particular reference to specific equipment arrangements and to specific experiments, these features are merely exemplary of the invention and variations are contemplated. For example, U-shaped or concentric adsorption vessels can be used in the adsorption system of the invention. This will enable all conduits to be located at one end of the adsorption vessels, thus rendering the adsorption system more compact. The scope of the invention is limited only by the breadth of the appended claims.

What is claimed is:

1. A valve assembly for providing selective flow communication between two conduits of a first set of fluid flow conduits and between two conduits of a second set of fluid flow conduits comprising a first inlet port, a first outlet port and first and second valve members having respective engaged surfaces relatively rotatable about a common center of rotation to provide valving action, said first valve member having a first set of equally spaced through apertures concentrically disposed at a first radius from said common center of rotation with each aperture being in fluid communication with one conduit of said first set of fluid flow conduits and a second set of equally spaced through apertures concentrically disposed at a second radius from said common center of rotation with each aperture being in fluid communication with one conduit of said second set of fluid flow conduits, said first and second sets of apertures comprising the same number of apertures; said second valve member having at least one first passage means for selectively interconnecting two apertures of said first set of apertures, at least one second passage means for providing fluid communication between said first inlet port and one or more apertures of the second set of apertures and at least one third passage means for providing fluid communication between said first outlet port and one or more apertures of the second set of apertures; and drive means for effecting relative rotation of said valve members to enable rotationally cycled interconnection and fluid flow between two apertures of said first set of apertures, between said first inlet port and one or more apertures of said second set of apertures and between said first outlet port and one or more apertures of said second set of apertures.

2. The valve assembly of claim 1, wherein said first valve member is stationary and said second valve member is rotatable.

3. The valve assembly of claim 1, wherein said first and second sets of apertures comprise the same even number of apertures.

4. The valve assembly of claim 1, wherein said first and second sets of apertures each have two apertures, and said second valve member has one first passage means for selectively interconnecting two apertures of said first set of apertures, one second passage means for providing fluid communication between said first inlet port and one or more apertures of said second set of apertures and one third passage means for providing fluid communication between said first outlet port and one or more apertures of said second set of apertures.

5. The valve assembly of claim 1, wherein said first and second sets of apertures each have more than two apertures.

6. The valve assembly of claim 5, wherein said second valve member has two first passage means each of which selectively interconnects two apertures of said first set of apertures, two second passage means for providing fluid communication between said first inlet port and one or more apertures of said second set of apertures and two third passage means for providing fluid communication between said first outlet port and one or more apertures of said second set of apertures.

7. The valve assembly of claim 6, wherein each set of apertures of said first valve member has a total of 8, 12, 16 or 20 apertures.

8. The valve assembly of claim 1, further comprising a second outlet port, and wherein said second valve member additionally has at least one fourth passage means for providing fluid communication between said second outlet port and one or more apertures of said first set of apertures.

9. The valve assembly of claim 8, wherein each fourth passage means is at least partly located in a radial sector from said common center of rotation in which a second passage means is located.

10. The valve assembly of claim 8, wherein a portion of each fourth passage means serves as a fifth passage means.

11. The valve assembly of claim 1, further comprising a second inlet port and wherein said second valve member additionally has at least one fifth passage means for providing fluid communication between said second inlet port and one or more apertures of said first set of apertures.

12. The valve assembly of claim 1, further comprising a third inlet port and wherein said second valve member additionally has at least one sixth passage means for providing fluid communication between said third inlet port and one or more apertures of said first set of apertures.

13. The valve assembly of claim 12, wherein each sixth passage means is located in the radial sector from said common center of rotation in which a third passage means is located.

14. The valve assembly of claim 13, wherein the radial sector in which each sixth passage means is located has a lesser angular extent than the radial sector in which each passage means is located.

15. The valve assembly of claim 1, wherein said drive means effects continuous relative motion of said valve members.

16. The valve assembly of claim 1, wherein said drive means effects stepwise relative motion of said valve members.

17. An adsorption system comprising the valve assembly of claim 1 and an array of adsorption vessels each having a feed inlet end and a product outlet end and containing an adsorbent which preferentially adsorbs one or more fluids of a fluid mixture, wherein each conduit of said first set of fluid flow conduits is connected to the product outlet end of one vessel of said array of adsorption vessels and each conduit of said second set of fluid flow conduits is connected to the feed inlet end of one vessel of said array of adsorption vessels.

18. An adsorption system comprising the valve assembly of claim 6 and an array of adsorption vessels each having a feed inlet end and a product outlet end and containing an adsorbent which preferentially adsorbs one or more fluids of a fluid mixture, wherein each conduit of said first set of fluid flow conduits is connected to the product outlet end of one vessel of said array of adsorption vessels and each conduit of said second set of fluid flow conduits is connected to the feed inlet end of one vessel of said array of adsorption vessels.

19. The adsorption system of claim 17 or claim 18, wherein said first radius is greater than said second radius.

20. The adsorption system of claim 17 or claim 18, wherein said valve assembly has a second outlet port and said second valve member additionally has at least one fourth passage means for providing fluid communication between said second outlet port and one or more apertures of said first set of apertures.

21. The adsorption system of claim 20, wherein each fourth passage means is at least partly located in a radial sector from said common center of rotation in which a second passage means is located.

22. The adsorption system of claim 20, wherein a portion of said at least one fourth passage means serves as a fifth passage means.

23. The adsorption system of claim 17 or claim 18, wherein said valve assembly has a second inlet port and said second valve member additionally has at least one fifth passage means for providing fluid communication between said second inlet port and one or more apertures of said first set of apertures.

24. The adsorption system of claim 17 or claim 18, further comprising a third inlet port and wherein said second valve member additionally has at least one sixth passage means for providing fluid communication between said third inlet port and one or more apertures of said first set of apertures.

25. The adsorption system of claim 24, wherein each sixth passage means is located in a radial sector from said common center of rotation in which a third passage means is located.

26. The adsorption system of claim 25, wherein the radial sector in which each sixth passage means is located has a lesser angular extent than the radial sector in which each third passage means is located.

27. The adsorption system of claim 17 or claim 18, wherein said adsorption vessels are U-shaped or concentric.

28. A process comprising introducing into the first inlet port of the adsorption system of claim 17 or claim 18, while said first and second valve members are in relative rotation, a fluid mixture which contains at least one component which is preferentially adsorbed by said adsorbent relative to at least one other component of said fluid mixture, while withdrawing through said second outlet port fluid enriched in said at least one other component, and withdrawing through said first outlet port fluid enriched in said at least one component and providing outlet-to-outlet equalization between selected vessels of the system via said at least one first passage means.

29. The process of claim 28, wherein said fluid mixture is a gaseous mixture.

30. The process of claim 29, wherein said gaseous mixture is air.

31. The process of claim 30 wherein said at least one component is oxygen and said at least one other component is nitrogen.

32. The process of claim 30, wherein said at least one component is nitrogen and said at least one other component is oxygen.

* * * * *